United States Patent
Penston et al.

(10) Patent No.: US 8,949,438 B2
(45) Date of Patent: Feb. 3, 2015

(54) DATA SYNCHRONISATION TO AUTOMATE CONTENT ADAPTATION AND TRANSFER BETWEEN STORAGE DEVICES AND CONTENT SERVERS

(75) Inventors: Jeremy Penston, NR Royston (GB); Nihat Karaoglu, Heverlee (BE)

(73) Assignee: Omniplug Technologies, Ltd., New Market, Suffolk (GB)

( * ) Notice: Subject to any disclaimer, the term of this patent is extended or adjusted under 35 U.S.C. 154(b) by 961 days.

(21) Appl. No.: 12/989,633

(22) PCT Filed: Apr. 24, 2009

(86) PCT No.: PCT/GB2009/001061
§ 371 (c)(1),
(2), (4) Date: Oct. 25, 2010

(87) PCT Pub. No.: WO2009/130484
PCT Pub. Date: Oct. 29, 2009

(65) Prior Publication Data
US 2011/0047278 A1    Feb. 24, 2011

(30) Foreign Application Priority Data

Apr. 25, 2008  (GB) .................................. 0807590.5
Nov. 24, 2008  (GB) .................................. 0821411.6

(51) Int. Cl.
*G06F 15/16*      (2006.01)
*G06F 17/30*      (2006.01)

(52) U.S. Cl.
CPC .... *G06F 17/30176* (2013.01); *G06F 17/30905* (2013.01); *H04L 61/1095* (2013.01)
USPC ............. 709/227; 709/246; 709/248

(58) Field of Classification Search
CPC ..................... G06F 17/30176; G06F 17/30905; H04L 67/1095
USPC ......................... 709/227, 246, 248
See application file for complete search history.

(56) References Cited

U.S. PATENT DOCUMENTS 6,006,274 A    12/1999  Hawkins et al.
6,457,062 B1    9/2002  Pivowar et al.
(Continued)

FOREIGN PATENT DOCUMENTS

EP    1 130513 A2    5/2001
EP    1130511 A2    9/2001
(Continued)

OTHER PUBLICATIONS

Apple Sync Services Programming Guide; XP-002532278; Oct. 31, 2007, pp. 1-94; http://developer.apple.com/documentation/cocoa/conceptual/syncservices/syncservices.pdf; retrieved from the Internet on Jun. 6, 2009.
(Continued)

*Primary Examiner* — Mohamed Wasel
(74) *Attorney, Agent, or Firm* — Blank Rome LLP

(57) ABSTRACT

A data synchronisation system automating content adaptation and transfer between storage devices and content servers, independent of user device. Included is a data storage device, a synchronisation device that uploads, downloads and processes content data, a control server handling connection data and capability data, controlling the synchronisation device, and at least one content server. The synchronisation device communicates with the data storage device, accesses a device identifier, and connects to the control and/or content server. The control server processes the device identifier and sends connection and capability data to the synchronisation device, which processes the connection and capability data, establishes a connection with the content server based thereon, and performs at least one of downloading and adapting content data to a data storage device format, and uploading same to the data storage device; and of downloading and adapting content data for compatibility with, and uploading to, the destination content server.

20 Claims, 6 Drawing Sheets

(56) References Cited

U.S. PATENT DOCUMENTS

| | | | |
|---|---|---|---|
| 6,725,262 B1* | 4/2004 | Choquier et al. | 709/221 |
| 7,039,656 B1 | 5/2006 | Tsai et al. | |
| 7,765,326 B2* | 7/2010 | Robbin et al. | 709/248 |
| 2002/0065939 A1 | 5/2002 | Liu | |
| 2002/0147929 A1 | 10/2002 | Rose | |
| 2003/0150912 A1 | 8/2003 | Lu et al. | |
| 2004/0006630 A1 | 1/2004 | Friend et al. | |
| 2004/0024867 A1* | 2/2004 | Kjellberg | 709/224 |
| 2005/0181839 A1 | 8/2005 | Tiainen et al. | |
| 2006/0158154 A1 | 7/2006 | Maurilus | |
| 2007/0016632 A1 | 1/2007 | Schulz et al. | |
| 2007/0079651 A1 | 4/2007 | Denkmayr | |
| 2007/0208810 A1* | 9/2007 | Mostafa | 709/206 |
| 2007/0226272 A1 | 9/2007 | Huang et al. | |
| 2007/0276866 A1 | 11/2007 | Bodin et al. | |
| 2007/0299681 A1 | 12/2007 | Plastina et al. | |
| 2009/0144434 A1* | 6/2009 | Tian et al. | 709/228 |
| 2011/0010383 A1* | 1/2011 | Thompson et al. | 707/769 |
| 2012/0072538 A1* | 3/2012 | Ma et al. | 709/217 |

FOREIGN PATENT DOCUMENTS

| | | |
|---|---|---|
| EP | 1130513 A2 | 9/2001 |
| EP | 1710979 | 10/2006 |
| EP | 1976181 A1 | 10/2008 |
| GB | 2435563 A | 8/2007 |
| JP | 2000312178 A | 11/2000 |
| JP | 2002237876 A | 8/2002 |
| JP | 2004015511 A2 | 1/2004 |
| JP | 2004015511 A3 | 1/2004 |
| JP | 2004274528 A | 9/2004 |
| WO | WO 01/025948 | 4/2001 |
| WO | WO 01/25948 A1 | 4/2001 |
| WO | WO 01/53963 A1 | 7/2001 |
| WO | WO 01/80091 A2 | 10/2001 |
| WO | WO 02/11367 | 2/2002 |
| WO | WO 03/005557 A1 | 1/2003 |
| WO | WO 2007/035275 A2 | 3/2007 |
| WO | WO 2007/079651 A1 | 7/2007 |
| WO | WO 2007/084426 A2 | 7/2007 |
| WO | WO 2008/045858 A1 | 4/2008 |

OTHER PUBLICATIONS

PCT/GB2009/001061 Search Report and Written Opinion; Sep. 9, 2009; 21 pages.
"Welcome_to_Castgrabber"; www.castgrabber.net/support.php; 2009. 4 pages.
Search Report #1 mailed on Aug. 12, 2008; 3 pages.
Search Report #2 mailed on Mar. 23, 2009; 2 pages.
Search Report #3 date mailed: unknown; 5 pages.
Search Report #4 mailed on Jan. 19, 2009; 6 pages.
Search Report #5 mailed on Jan. 19, 2009; 2 pages.
Search Report mailed on Jan. 19, 2011; 6 pages.

* cited by examiner

DATA SYNCHRONISATION TO AUTOMATE CONTENT ADAPTATION AND TRANSFER BETWEEN STORAGE DEVICES AND CONTENT SERVERS

CROSS-REFERENCE TO RELATED APPLICATION

This application is a Continuation-In-Part and U.S. National Phase entry of PCT/GB2009/001061 filed Apr. 24, 2009, and claims priority to Great Britain Patent Application No. 0807590.5 filed Apr. 25, 2008, and Great Britain Patent Application No. 0821411.6 filed Nov. 24, 2008, each of which is incorporated herein by references hereto.

FIELD OF THE INVENTION

The present invention relates to a system, apparatus and method for synchronising data between a portable data storage device and a data store, which is generally provided by a content server.

BACKGROUND OF THE INVENTION

Portable data storage devices capable of holding, recording and/or playing digital content are becoming more prevalent. For example, it is now not uncommon for a mobile telephone to be able to record and/or play back video, take and/or display pictures, record and/or play back sound files including MP3 files and the like; download and/or upload files from the Internet or other networks. This is equally true of other mobile devices such as cameras, MP3/MP4 players (a generic term used to refer to portable music/video playing devices such as the iPod™, or the like).

There is often a desire for a user to move data onto and/or from the portable data storage device. This data movement can be to take newly generated data (such as a photograph, video, etc.) off the device in order to store it for archival purposes or share it with a set of users through a common data storage, and/or to add new data to the device or subsequent playback (for example the addition of a new music file which may be a song, a podcast, etc.), a video, etc.

Such movement of data can typically occur via a number of mechanisms. For example, some devices may be connected to a personal computer such as a PC, Apple™, etc. which subsequently performs the data movement. Other devices, can move data via telecommunication networks such as a GSM (Global System for Mobile communications), UMTS (Universal Mobile Telecommunications System) network or the like. Yet further devices can communicate with wireless networks such as a WIFI (IEEE 802.11x where x is any number of letters) network, or the like.

However, telecommunications networks such as GSM, UMTS networks and the like are not intended to transmit high bandwidth data such as video, music, etc. As such the quality of data received on the data storage device may not be suitable to view in what is generally termed real time. Further, such networks are expensive to use and as users can be faced with high usage costs to transfer data across them.

Also, movement of data to and/or from a portable device typically requires significant user intervention which often deters users from moving the data. As such, newly generated data is at risk of being lost because users may tend to leave the data only on the mobile device and as such if the device is lost or broken then the data is gone. Alternatively, the memory of a device may become full or the number of files may become excessive making data hard to access as users may not remove files because it is hard to manage data on the restricted user interfaces of typical portable data storage devices Further, these devices do not offer a way to share the data with a set of users because of limited or no networking capability (e.g. digital photo camera, mp3 player, thumbdrive) unless the user transfers the data to a personal computer and then to it's final destination where the content will be shared. (e.g. a web based photo album, a video sharing network such as YouTube™).

SUMMARY OF THE INVENTION

According to a first aspect of the invention there is provided a data synchronisation system comprising:
  a data storage device;
  a synchronisation device arranged to synchronise at least content data stored on the data storage device;
  a control server arranged to control operation of the synchronisation device; and
  one or more content servers;
  wherein the synchronisation device is arranged to have connected thereto the data storage device and is also arranged to establish a connection to the control server and/or the content server via a network;
  the control server is arranged to send connection data to the synchronisation device which determines to which content server the synchronisation device establishes a connection; and
  the synchronisation device being further arranged to process the connection data and establish a connection with the or each content server based upon the connection data and, further, dependent upon the connection data to perform at least one of:
    i: download content data from the content server;
    ii. upload content data received from the content server to the data storage device;
    iii. download content data from the data storage device; and
    iv. upload content data received from the data storage device to the content server.

Embodiments of such a system are believed advantageous as they store the connection data remotely from the data storage device and the synchronisation device. As such, data security may be enhanced. Such a system may allow a user to conveniently share his/her data and/or update content on the data storage device. This may occur irrespective of his/her location and/or data storage device that is connected to the synchronisation device.

Further, moving functionality from the synchronization device to the control server may reduce complexity of the programming required within that device.

A further advantage of such a system might be that it can also reduce the amount of waste during a user upgrade of his/her data storage device (eg a user obtains a new mobile telephone or the like) since processing circuitry within the synchronisation device is shared by multiple data storage devices can be reused with the new data storage device. As such, the processing circuitry within the data storage device may be simplified.

Conveniently, the synchronisation device is arranged to obtain a device identifier from the data storage device.

Conceivably, the data storage device may not comprise a unique device identifier. The synchronization device may be arranged to place a device identifier on such a data storage device. For example, the synchronization device may be arranged to write a file, or the like, to the data storage device containing the device identifier.

In some embodiments, if it is to write the device identifier to the data storage device, the synchronization device may be arranged to obtain the device identifier from the control server. Alternatively, the synchronization device may be arranged to generate the device identifier.

The synchronisation device may be arranged to transmit one of the device identifier and a synchronisation device identifier to the control server which is arranged to send connection data tailored to at least one of the identifiers. As such, that the connection data may be thought of as a profile for the data storage device and/or the synchronisation device which can be retrieved using a relevant identifier.

The control server may also be arranged to generate capability data which provides the capabilities of the data storage device associated with the device identifier. In some embodiments, the capability data may be provided as part of the connection data.

Generally, the capability data provides the capabilities of the data storage device that generated the device identifier. In such an embodiment, the synchronisation device may be arranged to: download content data from a content server in a first data format, adapt the content data according to the device capabilities held in the capability data and upload the adapted content to the data storage device. Such an arrangement is advantageous because it allows the data storage device to download content data that is held in a format that it cannot use and subsequently have the content adapted in order that it can use the content data. As such, the system may be arranged to process and transfer content data based on what is known about the data storage device and/or the user of the data storage device, in effect translating data between source and destination.

The synchronisation device may be arranged to upload content data from the data storage device, adapt the downloaded content data according to the capability data, to be compatible with the destination content server as specified in the connection data.

The system, and possibly the control server in particular, may be arranged to suggest content for the data storage device. This may be thought of as proactively adapting data by suggesting content.

In additional, or alternative embodiments, the system, and possibly the synchronisation device in particular, may be arranged to adapt content as it is sent and/or received and such an arrangement may be thought of as reactively adapting content.

Proactively adapting content may mean that the system allows the user to copy one or more content server subscriptions to a second or new data storage device during which process, the system may or may not adapt the or each setting to cater for the differences in capabilities between data storage devices with or without assistance from a user. In an example, the user may copy a YouTube™ channel subscription from a mobile phone to a PSP™ (Play Station Portable) without having to specify the differences in file format and screen size as the system may adapt this automatically. In a further example, should a user upgrade from an older digital picture frame to one that can play video and audio, the system may proactively suggest new content to add to the existing subscriptions.

Some of the embodiments may be arranged to perform each of steps i to iv. However, in some embodiments, whilst the synchronisation device may be arranged to perform each of these steps i to iv, they may not be performed at once. For example, data may only be moved from the data storage device toward the content server when content data is available on the data storage device. Likewise data may only be moved from the content server toward the data storage device when there is content data available on the content server.

Steps i and ii may be performed concurrently, or at least substantially concurrently. However, in some embodiments data downloaded from the content server may be buffered within the synchronisation device before being uploaded to the data storage device.

Alternatively, or additionally, steps iii. and iv may be performed concurrently, or at least substantially concurrently. However, in some embodiments, data downloaded from the data storage device may be buffered within the synchronisation device before being uploaded to the content server.

The data storage device may be connected to the synchronisation device by a first data connection which may be wired and/or wireless.

For example, the synchronisation device may comprise a first data connection which may be arranged to connect to USB (Universal Serial Bus), Firewire, Ethernet (including Power over Ethernet). Embodiments in which the first network connection between the data storage device and the synchronisation device are wired can be advantageous as they may allow the data storage device to be charged as it is being synchronised.

Alternatively, or additionally, the first data connection may be a wireless connection such as WIFI (IEEE 802.11x), Bluetooth, iRDA (Infra Red Data Association), WiMax, Zigbee, or the like. Embodiments in which the first network connection between the data storage device and the synchronisation device are wireless can be advantageous as they can provide a user with flexibility as to the location of the data storage device; there is no need to place the data storage device in physical proximity of the synchronisation device.

The first data connection may typically be a short range connection since it is likely that the synchronisation device and the data storage device will generally be physically close to one another. Thus, short range is intended to mean a connection between two proximal devices rather than a long range connection such as between devices in different rooms, or even different buildings. Some embodiments may provide long range data connections.

The data storage device may be any of the following: a digital camera (whether still, video or combination thereof), a mobile telephone, an MP3/MP4 player, a watch, a games console or any combination of these. The data storage device may also be part of the fixtures and fittings of a building, be inside a domestic appliance, a car or any other device capable of generating and/or storing data but generally, the data storage device will comprise a device which is capable of being held in a user's hand; ie it is a handheld device. As such, the data storage device is likely to be considered a portable device.

The synchronisation device may be connected to a second network which is connected to a Wide Area Network (WAN), such as the Internet. The system may comprise an access device arranged to connect the synchronisation device to a Wide Area Network (WAN). The access device may comprise any suitable device such as a MODEM, a router, or the like. The access device may or may not be provided as part of the synchronisation device.

In one embodiment the access device is an ADSL (Asymmetric Digital Subscriber Line) MODEM in conjunction with a wireless router. In such an embodiment, the synchronisation device is arranged to connect to the access device via the wireless router (which provides a second network) which subsequently connects to the Internet via the ADSL MODEM.

In an alternative, or perhaps additional embodiment, the access device is a Homeplug MODEM, which may be an ADSL MODEM. In such an embodiment, the synchronisation device is arranged to connect to the access device via the mains wiring of the building in which it is used (which provides a second network) which subsequently connects to the Internet via the MODEM.

The synchronisation device may comprise a second data connection arranged to connect the synchronisation device to the second network. The second data connection may be arranged to connect in a wired and/or wireless manner. Indeed, the connection to the second network may be any of the technologies mentioned in relation to the first data connection of the synchronisation device.

Additionally, the second data connection may comprise a means to send data over mains wiring. For example, the connection to the second network may be via a HomePlug™ protocol or the like.

In some embodiments, the synchronisation device may be provided within the housing of mains plug arranged to be plugged into a mains socket and/or provided with a cable which plugs into a mains socket.

The synchronisation device may be arranged to store data from the data storage device upon a file store upon the second network. The file store may be provided by a personal computer such as a PC, Apple™ or the like, a Network Attached Storage (NAS) device or the like.

Alternatively, or additionally, the device may be arranged to store data from the storage device upon a file store connected to a WAN connected to the second network, such as a content server.

In some embodiments, the synchronisation device may be arranged to store data from the data storage device upon a remote data display device connected to the second network and/or a WAN connected to the second network. The remote data display device may comprise a digital photo frame. As such, embodiments of the system may provide a convenient mechanism which can reduce the amount of user interaction needed to update information on a digital photo frame. In such an embodiment, the display device may be thought of as a content server.

The synchronisation device may comprise a local power source. The local power source may be arranged to power the synchronisation device and/or a storage device connected thereto. Provision of a local power source in this manner can advantageously make the synchronisation device portable.

The local power source might for example be a battery, a solar cell, a fuel cell, a wind up source, or any other suitable means.

The synchronisation device may be arranged to run one or more applications that adapt the upload and/or download of content data to/from a data storage device parameterised by the connection data in the same way. These applications may be arranged to adapt the content data by applying criteria to the transfer of data to and/or from the data storage device. They may also adapt the content data to deliver additional features by combining data from one or more sources. These sources include at least one of the following: one or more data storage devices; one or more synchronisation devices; one or more control servers; and one or more content servers. The applications may also drive or provide other data to other applications installed either on one or more data storage device and/or one of more content servers.

The synchronisation device may be arranged to combine content data that is obtained from a plurality of content servers. Such an arrangement may be useful to create newsreels or mashups of intelligently selected content data from multiple sources. The system may for example be arranged to use filters on one or more content servers to download and combine one or more files relating to a certain search phrase like a favourite sports team. This same method of combining files may also be used to place advertising within the content and may use information gathered about the user within the system, or from sources external to the system, to intelligently place such content data.

The synchronisation device may be arranged to download program data to the storage device. The program data may be determined by the device identifier and/or device capability such as specified in the capability data. Such program data may be executable by an Operating System (OS) running on the data storage device or may be the, or at least a component of, the OS. Such an arrangement may allow an application to be delivered to a data storage device taking into account the OS of the data storage device. Applications on the storage device may or may not be fully or partially controlled by the synchronisation device and may or may not be parameterised by the connection data (ie have parameters set within an application set by the synchronisation device as controlled by the capability and/or connection data).

The synchronisation device may be arranged to adapt the transfer of content data from a data storage device to a content server. Such an arrangement may be beneficial, for example to either limit bandwidth use or to enable service features. For example, the transfer may be started and stopped intelligently by the synchronisation device, generally by an application running thereon. This may be useful for example, if the data storage device is a web cam which is monitored by the synchronisation device. The synchronisation device may be configured to start streaming when movement is detected and/or depending on time of day, or the like. The content server may be configured to store the images, but may also relay them on to security personnel.

Some embodiments of the system may be arranged to provide a web conferencing service. In such an embodiment, the content server may be arranged to provide a remote display device with either an embedded and/or separately connected camera and the control server may be arranged to be a signalling platform that controls how the synchronisation device directs content data (ie video and/or audio signal in this embodiment).

A combination of one or more applications running on a data storage device and one or more applications running on a synchronisation device may be configured according to the connection data and/or the capability data. These applications working together may for example allow all or parts of a data storage device to be backed up and/or have its contents and settings transferred to a second data storage device and/or content server. Such an embodiment, may prove advantageous as it would allow a user to configure a new data storage device (ie second data storage device) with settings uploaded from an existing data storage device. In one specific example, a user may configure a new mobile telephone with settings from his/her existing mobile telephone, wherein the mobile telephone provides an example of a data storage device.

The synchronisation device may be arranged to upload settings from a first data storage device, to map the transfer of settings to a second data storage device and download the mapped settings to a second data storage device.

In additional or alternative embodiments, the system may be arranged such that customer service may be provided to users of data storage devices. The system may be deployed to deliver error checking software directly to the data storage device or may be arranged to run such software as an application on the synchronisation device. Such an application may allow a service agent to fix problems either by manual inspection or automatically through the application itself downloading new settings to the data storage device. The system may also use the backup and replacement capability in this scenario to ensure no loss of data.

The system may comprise a profile database containing data identifying any of the following, using the device identifier as an identifier to the database (which might be the primary key):
the user owning the device;
any other devices owned by the same user;
the type of device;
for example whether it is a phone, camera, MP3 player, Video player, PSP, thumb drive, web camera, etc. where each type has a unique mixture of photo/video/audio/application high level data creation and consumption capabilities. Such information may be used to suggest appropriate content servers; for example photo stores for cameras and phones but not for MP3 players which do not handle image data and also to determine which applications to run on the synchronisation device;
a list of one or more data storage device formats the data storage device is capable of utilizing
for example containing device specific information such as the screen size, supported file formats, operating system and program environment, etc.;
a list of one or more content servers to which the data storage device can upload content data,
the user ID and password of any personalized account on the or each content server, the file format(s) supported by the or each content server,
the or any application or combination thereof to be run on the synchronisation device and/or storage device to communicate with the or each content server,
the number of files to be uploaded and their directory sources on the storage device for the or each content server,
any tags to attach to files or groups during the or each transfer process where such tags may or may not be generated by an application running on the synchronisation device,
data not on the storage device to be combined with data from the storage device by an application on the synchronisation device to create one or more combined files for sending on to the or each content server,
where the content server may be another storage device; and
a list of one or more content servers from which the data storage device may download content data.
the user ID and password of any personalized content feed on the or each content server,
the file format(s) delivered by the or each content server,
the or any application or combination thereof to be run on the synchronisation device and/or storage device to communicate with the or each content server,
the number of files to be downloaded and their directory destinations on the storage device for the or each content server,
any filters to apply to content available on the or each content server,
any tags to attach to files or groups of files during the or each transfer process where such tags may or may not be generated by an application running on the synchronisation device,
data from one or more content servers may be combined by an application on the synchronisation device to create one or more combined files for the or each storage device,
where the content server may be another storage device The profile data is generally held by device ID. Each data storage device may be associated with a user who can control the or each data storage device from a control panel which may be accessible remotely. Such a control panel may or may not be provided by a 3$^{rd}$ party and may write service updates to the Control Server through a secure application interface.

Generally, the profile database is held on the control server. However, in some embodiments, it is conceivable that the profile database is held on the synchronization device. Further in some embodiments, a plurality of databases may provide the profile database.

In a likely use of the system components, the content server and the control server are separate components to reduce the duplication of common elements across different content servers and to simplify content server subscription through reduced data entry. The control server may be arranged to hold the element that do not change from one content server to another, for example the device capabilities, and may also be arranged to allow a user to see a device centric view in a control panel to manage multiple content providers easily.

Furthermore, it is likely that the synchronisation device will be separate from the control server to enable any storage device to use any synchronisation device to access any content server in any format.

According to a second aspect of the invention there is provided a synchronisation device comprising:
processing circuitry;
a first data connection arranged to have a data storage device connected thereto and in communication with the processing circuitry;
a second data connection arranged to connect the synchronisation device to a network and pass data to and from the network from the processing circuitry;
wherein
the processing circuitry being arranged to:
1. establish a connection with a data storage device connected to the first data connection;
2. receive connection data from the second data connection and subsequently process said connection data;
the processing circuitry being further arranged to process the connection data and perform at least some of the following steps:
3. download data from a content server at a location specified by the connection data;
4. upload content data received from the content server to a data storage device connected thereto;
5. download content data from the data storage device; and
6. upload content data from received from the data storage device to a location specified by the connection data.

An advantage of such an arrangement is that the task of synchronising a data storage device is automated not only removing user inconvenience but also removing a user's computer from the task of synchronisation. As such, the complexity of configuring a computer is removed. The synchronisation device may allow a user to synchronise his/her data storage device regardless of location since the content data (which might be viewed as a user profile) is stored remotely.

The device may be arranged to obtain a device identifier from a data storage device connected thereto. Such an arrangement may bring the convenience of allowing a user to connect his/her device to any synchronisation device and still have his/her data process as desired. The device identifier may subsequently be used to obtain connection data for that device which may be used to route data as described therein.

The second data connection may provide what would commonly be termed a network connection.

Moreover, the data that is present on the data storage device is made more secure and less likely to be lost. As such a user is more likely to synchronise his/her data storage device. Data arranged to be uploaded and/or downloaded may include any of the following: pictures, such as photographs; video, such as MP4, DivX, etc.; MP3 or other sound files; contact details; files containing text, any other data format.

The processing circuitry may be arranged to perform each of steps 3 to 6. Alternatively, the processing circuitry may perform only some of the steps. For example, the processing circuitry may only establish one of the first and second data connections; it may be arranged to perform only one of uploading and downloading data to the data storage device.

The synchronisation device may be arranged to perform conversion of data uploaded from the data storage device and/or of data downloaded to the data storage device. The skilled person will appreciate that whilst many data storage devices have a wide range of data processing capabilities they may only be able to perform those capabilities upon data held in predetermined file formats. Thus, the synchronisation device may be arranged to convert data from one predetermined format to another predetermined format. For example, the synchronisation device may be arranged to convert a DivX movie to an MP4 movie. Conversion may be thought of as a form of adaptation.

The synchronisation device may be arranged to resize or re-sample data. For example, if the data is a picture, a movie, or the like then the synchronisation device may be arranged to alter the frame size such that it is suitable for the data storage device. In alternative or additional embodiments, the synchronisation device may be arranged to re-sample audio files in order to change the bit rate, etc. Resizing and re-sampling may be thought of as a form of adaptation.

Such data conversion may be specified in capability data downloaded data and may be specified in terms of the capabilities of the data storage device. Thus, embodiments of the invention may be advantageous in that they solve the problem of data compatibility between different devices. Further, arranging the synchronization device such that it is capable of adapting the content data from a first format to a second format should allow the content data to be obtained from a plurality of different content servers and should negate the need to maintain files (ie content data) in a plurality of different formats. However, the skilled person will appreciate that such adaption of content data is likely to be intensive in the processing that it requires. As such, it may be that processing circuitry that is provided within the synchronisation device is more powerful than the skilled person may otherwise expect.

Additional or alternative embodiments of the synchronisation device may be arranged to adapt content data downloaded from the data storage device to be compatible with the content server to which the connection data specifies the connection data should be sent. An example of where such an embodiment may prove useful would be in an arrangement that uploaded, perhaps automatically, data from the data storage device to a Web site such as Facebook, Flickr or the like. Such Web sites have a specific format in which data should be formatted and adaption of the data can facilitate uploading to such web sites.

The synchronisation device may be arranged to adapt content uploaded from the data storage device according to capability data.

The first data connection may be a wired connection and/or a wireless network connection. Should a wired network connection may be used then it may be arranged to charge the data storage device as it is connected to the synchronisation device.

The first data connection may be through a USB (Universal Serial Bus) link. Alternatively, or additionally, the first data connection may be provided by a Firewire connection, a WIFI connection, or the like. The first data connection may be any of the embodiments described in relation to the first aspect of the invention.

The second data connection may be achieved through Powerline Communications such as a network which conforms to HomePlug specifications (1.0, AV etc.). Alternatively, or additionally, the second data connection may be a WIFI, Ethernet or any other suitable form of connection.

In some further embodiments, the second data connection may be provided via a GSM, UMTS (or other 3G protocol), WIMAX (Worldwide Interoperability for Microwave Access—IEEE 802.16) connection. These protocols provide what may be termed long range connections which may be advantageous in an embodiment in which the synchronisation device is portable.

The second data connection may be any of the embodiments described in relation to the first aspect of the invention.

The device may comprise a local storage device, such as a hard drive or the like. The skilled person will appreciate that a hard drive may comprise either or both of a revolving platter and a solid state memory such as flash memory. In such a device data uploaded from the storage device may be stored upon the local storage device.

Additionally, or alternatively, the device may be arranged to transmit data uploaded from the data storage device across the second data connection to a file storage device. The device may be further arranged to transmit uploaded data across the Internet to a content server. The content server is generally a different server to the control server but this need not be the case.

The device may be arranged to send data over the second data connection in addition, or alternatively, to storing the data on the local storage device.

In some embodiments, the device may be arranged to transmit data from a data storage device connected thereto to a remote data display device connected via the second data connection and/or a WAN connected via the second data connection. The remote data display device may comprise a digital photo frame. As such, embodiments of the device may provide a convenient mechanism which can reduce the amount of user interaction needed to update information on a digital photo frame.

The device may be arranged to transmit account details and/or passwords, etc. in association with data uploaded from a data storage device connected thereto. Such an arrangement is convenient as it allows for a higher degree of security of the data.

The device may be provided by a device such as a set top box or the like. Alternatively, or additionally, the device may be provided as a free standing device.

The synchronisation device may be arranged to compare files stored on the data storage device with files held at the or each location specified by the connection data and to subsequently move data to and/or from the data storage device in order that the files are substantially the same. The data synchronisation device may however convert some files as discussed hereinbefore such that they are compatible with the data storage device.

The data synchronisation device may be arranged to compare dates of files in order to determine which file(s) need to be moved between the data storage device and location specified in the connection data and/or visa versa.

According to a third aspect of the invention there is provided a method of synchronising data held on a data storage device comprising the following steps:
 i. establishing a connection with the data storage device and a synchronisation device;
 ii. establishing a connection between the synchronisation device a control server via a second data connection;
 iii. sending connection data from the control server to the synchronisation device, the connection data providing the address of one or more content servers;
 iv. causing the synchronisation device to download content data to the data storage device from the content server specified in the connection data and/or uploading content data from the data storage device to a location specified by the connection data.

The method may be arranged to upload data from the data storage device. The upload of data from the data storage device may controlled by the connection data received from the control server.

The method may comprise receiving, on the control server, an identifier identifying the data storage device and/or data synchronisation device to which the connection data will be sent. Such a method may be advantageous since it allows the connection data to be tailored to the data storage device and/or data synchronisation device.

The method may comprise sending the identifier from the data synchronisation device to the control server.

Alternatively, or additionally, the synchronisation device may obtain a device identifier from the data storage device. The device identifier may subsequently be sent to the control server. Such a method is convenient as it may allow a user to synchronise his/her data storage device regardless of the synchronisation device to which it is attached.

According to a fourth aspect of the invention there is provided a control server comprising:
 a processing circuitry;
 a network connection which receives and transmits data between the processing circuitry and a network connected to the network connection;
 a data store accessible by the processing circuitry and being arranged to store connection data;
 the processing circuitry being arranged to:
  receive data from the network indicative that a synchronisation device is requesting data from the network;
  access the data store and retrieve connection data associated with the synchronisation device requesting that data; and
  transmit the connection data to the synchronisation device via the network connection.

The processing circuitry may be arranged to receive one or both of a device identifier and a data synchronisation device identifier. Such a method may allow the server to tailor connection data to the or each device identified by the identifier.

According to a fifth aspect of the invention there is provided a method of synchronising a portable data storage device comprising;
 i. receiving a request, from a network, for indicative that a synchronisation device is making a request for data;
 ii. accessing a data store to retrieve connection data associated with the synchronisation device that has made the request; and
 iii. transmitting the connection data to the synchronisation device that made the request.

According to a sixth aspect of the invention there is provided a machine readable medium containing instructions which when loaded onto a machine cause that machine to function as the server of the fourth aspect of the invention.

According to a seventh aspect of the invention there is provided a machine readable medium containing instructions which when read by a machine cause that machine to function as the synchronisation device according to the second aspect of the invention.

According to a eighth aspect of the invention there is provided a machine readable medium containing instructions which when read by a machine cause that machine to provide at least a portion of the method of the first, third and/or fifth aspects of the invention.

According to a ninth aspect of the invention there is provided a method of uploading data to a display device comprising:
 1. establishing a first data connection between a data storage device and a data synchronisation device;
 2. uploading data via the first data connection;
 3. transmitting the uploaded data from the synchronisation device via a second data connection to the data synchronisation device to a remote display device; and
 4. displaying the uploaded data on the display device.

Conveniently, the display device comprises a digital photo frame or the like.

Such a method is convenient as it may allow a user to send data (such as picture images) from a camera to a friend and/or member of his/her family that is distant.

The method may be arranged to acquire a device identifier associated with the data storage device across the first data connection.

The method may send the device identifier to the control server. Subsequently, the control server may be arranged to transmit connection data to the data synchronisation device dependent upon the device identifier. Such a method may allow the data synchronisation device to receive connection data specifying how data held on the data storage device should be handled.

Alternatively or additionally embodiments, may transmit a synchronisation device identifier to the control server.

Some embodiments may not transmit an identifier to the control server. Such embodiments may have connection data programmed into the synchronisation device. For example, a user may be able to log into the synchronisation device and program the device with the connection data.

The method may upload data from the data storage device to a content server. Such storage on the data storage device may enhance data security within such embodiments since a copy of the data is held on the content server.

The method may comprise connecting the data synchronisation device to a display device. This may occur after the data synchronisation device has been disconnected from the data storage device. In some embodiments, the display device may be in a location remote from the data storage device.

Conveniently, a device identifier is uploaded from the display device to the data synchronisation device which conveniently identifies the display device to the data synchronisation device.

The device identifier for the display device may be sent to the control server.

The control server may be arranged to download connection data to the data synchronisation device including a pointer to the location of data uploaded from the data storage device to the content server.

Subsequently, the method may cause the display device to upload the data from the location.

The method may associate the identity of the data storage device with that of the display device. Such a method may allow subsequent invocations thereof to upload data from the data storage device to the display device without the need to connect the data synchronisation device to the display device. However, embodiments in which the data synchronisation device is initially connected to the display device may prove simply for a user and reduce the complexity of establishing an association between the data storage device and the display device.

The association may be held on one or more of the data synchronisation device, the data storage device, the content server or the control server.

Alternatively, or additionally, it may not be necessary to connect the data synchronisation device to the display device. For example, in such embodiments, it might be possible to program an association between the data storage device and the display device. For example, a user may be able to specify a network address for the display device. A user may also be able to specify login information such a user ID and/or password. The user id may be the device identifier from the data storage device.

According to a tenth aspect of the invention there is provided a data synchronisation system comprising:
 a data storage device having a device identifier;
 a synchronisation device arranged to synchronise at least content data stored on the data storage device;
 a control server arranged to generate connection data to control operation of the synchronisation device; and
 one or more content servers;
 wherein the synchronisation device is arranged to have connected thereto the data storage device, to access the device identifier, to establish a connection to the control server and/or the content server via a network and should a connection be established with the control server to send the device identifier to the control server;
 the control server is arranged to receive the device identifier, process the device identifier and to send connection data to the synchronisation device according to the device identifier which determines to which content server the synchronisation device establishes a connection; and
 the synchronisation device being further arranged to process the connection data and establish a connection with the or each content server based upon the connection data and, further, dependent upon the connection data to perform at least one of:
  i: download content data from the content server and upload content data received from the content server to the data storage device; and
  ii. download content data from the data storage device and upload content data received from the data storage device to the content server.

According to a eleventh aspect of the invention there is provided a data synchronisation system comprising:
 a data storage device;
 a synchronisation device arranged to synchronise at least content data stored on the data storage device;
 a control server arranged to control operation of the synchronisation device; and
 one or more content servers;
 wherein the synchronisation device is arranged to have connected thereto the data storage device and is also arranged to establish a connection to the control server and/or the content server via a network;
 the control server is arranged to send connection data to the synchronisation device which determines to which content servers the synchronisation device establishes a connection; and
 the synchronisation device being arranged to establish a connection with the or each content server based upon the connection data and to download content data from the content server and/or upload the content data to the data storage device.

According to a twelfth aspect of the invention there is provided a synchronisation device comprising:
 processing circuitry;
 a first data connection arranged to have a data storage device connected thereto and in communication with the processing circuitry;
 a second data connection arranged to connect the synchronisation device to a network and pass data to and from the network from the processing circuitry;
 wherein
 the processing circuitry being arranged to:
  1. receive connection data from the second data connection and subsequently process said connection data;
  2. establish a connection with a data storage device connected to the first data connection;
  3. download data from a location specified by the connection data to the data storage device; and
  4. upload data from the data storage device.

According to a thirteenth aspect of the invention there is provided a method of synchronising data held on a data storage device comprising the following steps:
 i. establishing a connection with the data storage device and a synchronisation device;
 ii. establishing a connection between the synchronisation device a control server via a second data connection;
 iii. sending connection data from the control server to the synchronisation device, the connection data providing the address of one or more content servers;
 iv. causing the synchronisation device to download data to the data storage device from the content server specified in the connection data.

According to an fourteenth aspect of the invention there is provided a synchronisation device comprising:
 processing circuitry;
 a first data connection arranged to have a data storage device connected thereto and in communication with the processing circuitry;
 a second data connection arranged to connect the synchronisation device to a network and pass data to and from the network from the processing circuitry;
 wherein
 the processing circuitry being arranged to:
  1. establish a connection with a data storage device connected to the first data connection, obtain a device identifier from the data storage device and forward that device identifier across the second data connection;
  2. receive connection data from the second data connection and subsequently process said connection data;
 the processing circuitry being further arranged to process the connection data and perform at least one of the following steps:
  3. download data from a content server at a location specified by the connection data and upload content data received from the content server to a data storage device connected thereto; and 4. download content data from the data storage device and upload content data from received from the data storage device to a location specified by the connection data.

In another aspect of the invention there is provided a synchronisation device arranged to synchronise data from a data storage device with a destination remote from the data storage device.

The machine readable medium may be any suitable medium for providing a machine with instructions such as a floppy disk, a CD ROM, a DVD ROM/RAM (including −R/−RW and +R/+RW), an HD DVD, a Blu Ray™ disc, a memory (such as a Memory Stick™, an SD card, a compact flash card, or the like), a disc drive (such as a hard disk drive), a tape, any magneto/optical storage, a network download (such as an Internet download, an FTP transfer, or the like), a wire.

Any features of one of the above aspects of the invention may be applicable, mutatis mutandis, with any of the other aspects of the invention.

The control and content server may be provided by the same server. The download of content data is referred to above. The skilled person will appreciate that many such references may equally refer mutatis mutandis to program data as described above.

BRIEF DESCRIPTION OF THE INVENTION

There now follows, by way of example only, a detailed description of embodiments of the current invention with reference to the accompanying drawings of which:

DETAILED DESCRIPTION OF THE INVENTION

Figure 1:
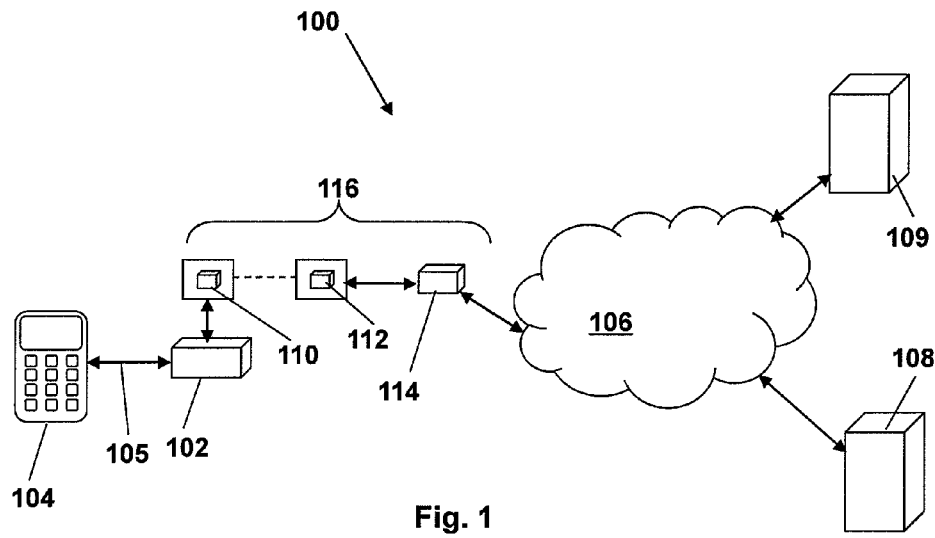
FIG. 1 shows a system realising an embodiment of the invention.

The system 100 shown in FIG. 1 comprises a synchronisation device 102 which has connected thereto a portable storage device 104. The synchronisation device 102 is also connected to the Internet 106 as are a control server 108 and a content server 109.

In the embodiment being described, the portable storage device 104 is a mobile telephone but other devices are equally possible. For convenience, reference will simply be made to telephone 104 hereinafter. The telephone 104 is connected to the synchronisation device 102 via a USB (Universal Serial Bus) connection which provides both a data connection and a power connection which is utilised to charge the telephone 104. This USB connection may be thought of as a first data 105 connection to the synchronisation device. Other embodiments may use other connections between the telephone 104 and the synchronisation device 102. Some embodiments may use both a wired and a wireless connection.

The telephone 104 comprises a device identifier, which allows that device to be identified and may be read by the synchronisation device 102 via the USB cable or other connection between them. For example, the identifier may be a Media Access Control (MAC) address, a cookie, a hardware and/or firmware and/or software definable value. In some embodiments, the device identifier may comprise a file that is written to the telephone by the synchronisation device 102.

The synchronisation device 102 is connected to and powered from a mains electricity supply outlet 110. The device 102 comprises a power line adapter which creates a network using the mains wiring of building. In some embodiments the synchronisation device 102 and may be provided within a plug which is plugged into the electricity supply outlet 110.

Another electricity supply outlet 112 of the mains wiring is connected via power line adapter to a MODEM 114 (in this case a Broadband ADSL MODEM incorporating a router, a DHCP server, etc.) which connects to the Internet 106. Thus, the synchronisation device 102 can connect to the Internet 106 via the MODEM 114, the two power line adapters and the network provided along the mains wiring of the building. This connection to the Internet 106 (via the mains wiring and the MODEM 114 may be thought of as a second data connection 116 to the synchronisation device 102).

Figure 2:
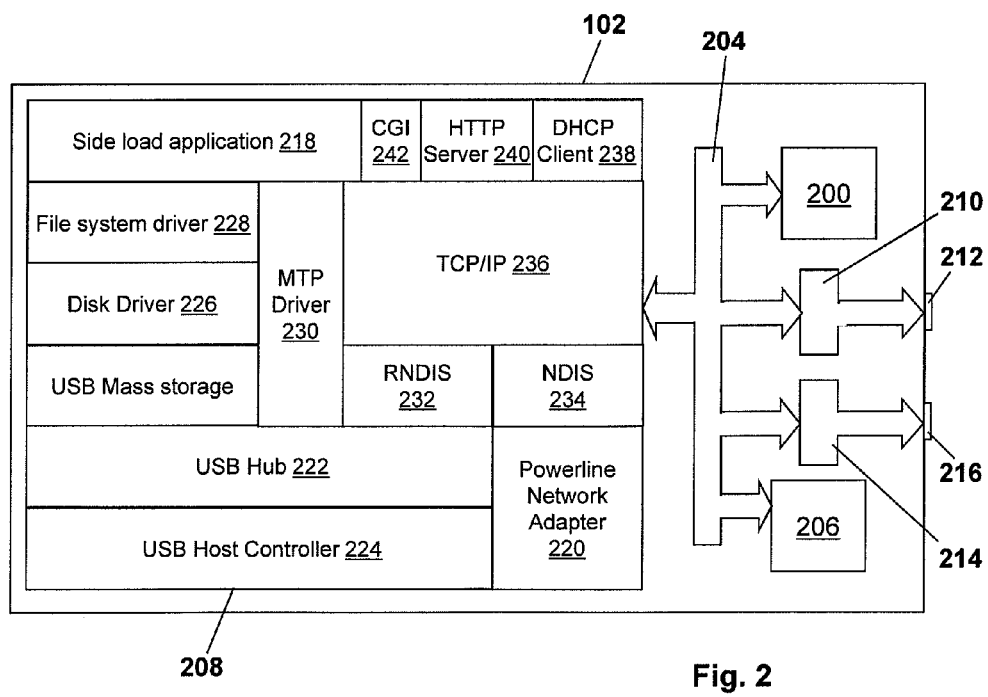
FIG. 2 shows a synchronisation device used in the system of FIG. 1.

The components of the synchronisation device 102 are shown in more detail in FIG. 2.

Within the synchronisation device 102 there is provided processing circuitry including a processor 200, a bus 204, volatile memory 206 and a non-volatile memory 208 in which various drivers are stored as described below. The device 102 also comprises driver electronics 210 to provide the first data connection (eg the USB connection) which is connected to the bus 204 and also to a connector 212 allowing a USB cable to be connected thereto. The device 102 also comprises driver electronics 214 to provide the second data connection (eg the Powerline Adapter) which is connected to the bus 204 and also to a connector 216 allowing a mains cable to be connected to the device.

The non-volatile memory 206 contains various driver and service application modules which are accessed and executed by the processor 200 according to an application program 218 to provide the functionality of the device 102.

A Powerline network adapter module 220 provides the protocol to drive the driver electronics 214.

A USB hub 222 module and a USB Host controller module 224 provides the protocol to drive the drive electronics 210 to allow a USB device to communicate with the processor 200. Data storage devices, such as the telephone 104 are implemented in various ways to enable communication and data transfer from/to a host system. Thus, the USB host controller module 224 enables mobile data storage devices that are implemented according to USB mass storage class specification to be used with the synchronisation device 102. A disk driver 226 implements ATA (Advanced Technology Attachment) and/or SCSI (Small Computer System Interface) commands allows the processor 200 to access the telephone 204 as a removable disk drive. A file system driver module 228 implements FAT12/16/32 file formats and lets the application 218 instruct the processor 200 to access data held on the telephone 104 which is organised in files and folders.

A MTP (Media Transfer Protocol) module 230 provides compatibility with telephones 104 which implement the MTP protocol over USB.

An RNDIS (Remote Network Driver Interface Specification) 232 module is provided to allow telephones 104 which implement Microsoft™ ActiveSync™ or OMA (Outlook Mobile Access) to be accessed by the processor 200.

An NDIS (Network Driver Interface Specification) module 234 allows data to be transmitted over the Powerline Network Adapter 220.

A TCP/IP (Transmission Control Protocol/Internet Protocol) module 236 provides access to both the RNDIS 232 and NDIS 234 modules.

A DHCP (Dynamic Host Configuration Protocol) client module 238 allows the synchronisation device to obtain a network address from a network connected via the second data connection 116 when in it is connected thereto.

An HTTP (Hypertext Transfer Protocol) server 240 allows remote access of the synchronisation device 102 via the second data connection 116 which can for example allow for remote configuration of the device 102 through the CGI (Common Gateway Interface) module 242. Thus for example, if it were desired to use a fixed network address for the device rather than an address obtained by the DHCP module 238 it is possible to remotely log onto the HTTP server 240 and make this configuration. Other configurations may be equally possible.

Figure 6:
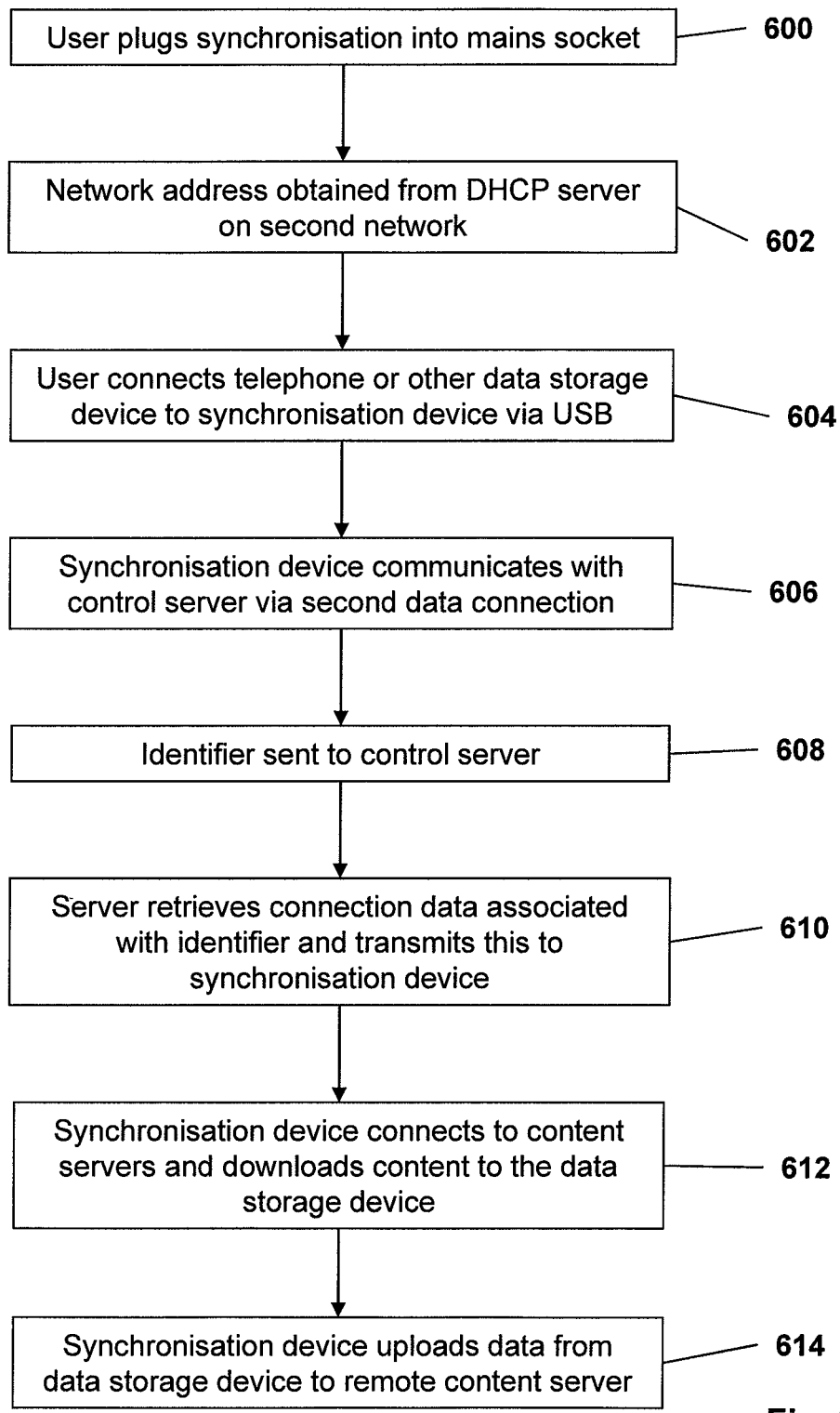
FIG. 6 shows a flow chart outlining the functioning of a method of one embodiment of the invention.

In use and as described in relation to FIG. 6, a user plugs the synchronisation device 102 into the mains wiring of a building (step 600). The DHCP module 238 communicates with a DHCP server within the network to which the Powerline Network Adapter 220 connects, such as within the MODEM 114 and obtains a network address for that network (step 602). As such, the synchronisation device 102 is acting as an IP addressable Internet endpoint and can be seen over the Internet by devices having its network address.

A user can then connect a telephone 104 to the synchronisation device 120 using a USB cable (step 604). Not only does the USB cable commence charging the telephone 104 but the USB hub and controller 222, 224 allow the processor 200 to communicate with the telephone 104 once a connection thereto has been established.

The synchronisation device 120 reads the device identifier from the telephone connected thereto 104.

Once a network address has been obtained by the DHCP module 238 the processor can communicate via the second data connection 116, via the Internet 106 to the control server 108 (step 606). Once this communication is established, the synchronisation device 102 is arranged to transmit a synchronisation device identifier (which is generally a unique identifier) to the control server 108 which identifies that synchronisation device 102 to the control server 108 (step 608).

In some embodiments, the synchronisation device 102 also transmits the device identifier across the second data connection 116 to the control server 608. In some embodiments, the synchronisation device may not transmit the synchronisation device identifier.

The control server is arranged to access a data store (such as a disk array) to which it has access and retrieves connection data and capability associated with either or both of the synchronisation device and/or device identifier. The capability data includes the capabilities of the telephone (ie the data storage device) to which the synchronisation device is connected and the connection data provides a list of content servers to and from which data should be respectively uploaded and downloaded.

In order to generate the connection and capability data, the control server comprises one or more databases which hold data for each device identifier. This may be thought of as a user profile since the device identifier will generally be specific to a single person unless that person shares the telephone. In the embodiment being described, the data held for each identifier includes: a list of web sites from which data should be downloaded to the telephone; a list of web sites to which data should be uploaded from the telephone; and the capabilities of the telephone.

This connection and capability data are then transmitted via the Internet 106 and the second data connection 116 to the synchronisation device and stored within the memory 206 (step 610). In some embodiments, the synchronisation device is arranged such that the connection and capability data are lost when power is removed from the device; ie the connection data is stored in a volatile memory thereof.

The connection data provides a reference (such as an IP address) to one or more content servers 109 from which a user of the telephone 104 which to obtain content. The synchronisation device 102 is arranged to access the connection data and subsequently connect to each of the content servers 109 specified therein and synchronise data held on the telephone 104 with the or each content server 109 (step 612). Thus, the control server 108 is storing a profile used to control what data is synchronised with the telephone 104 and it should be noted that content data is downloaded from a location which is generally different from the control server 108.

For example, the content server 109 may have thereon a daily podcast to which the user of the telephone 104 wishes to listen. In such an example the synchronisation of the telephone 104 includes a determination as to whether the telephone has stored thereon the latest version of the podcast. If the latest version is not present then the synchronisation device 102 downloads the latest version of the podcast from the content server 109 and uploads the podcast to the telephone 104.

Because the capability data holds information as to the capabilities of the device, the synchronisation device monitors the format of content data from the or each content server. If the synchronisation device determines that the format of the content data is not suitable for the telephone then the synchronisation device adapts the content data, from this first format, to a further format that the telephone is capable of processing and the adaption is performed as specified within the capability data. This further format may be thought of as a data storage device format. In the case of an audio file for example, the adaptation may be between MP3 and AAC format. As a further example, in the case of video the adaptation may include altering the screen resolution. As yet a further example, in the case of a document file, the adaptation may include converting a WORD™ file to a Rich Text file.

The synchronisation may also ensure that any media created by the storage device is synchronised with a remote source, which may be a content server 109 or a storage device on a network to which the second data connection 116 connects. This will help to ensure that no data such as photographs, videos, notes including audio and written or typed, contact information, etc. are lost if the telephone 104 is lost or damaged (step 614).

In some embodiments, the synchronisation device 102 may be arranged to store data received from the second data connection within a predetermined location (such as a folder) within the telephone 104. Such embodiments, may allow the synchronisation device 102 to store data received from the second data connection on the telephone 104 regardless of the identity of the telephone; ie a user may plug any telephone 104 into the synchronisation device and have data saved onto it from the synchronisation device 102.

Further, some embodiments of the synchronisation device 102 may be arranged to upload data from a predetermined location (such as a folder) when a telephone 104 is connected to the synchronisation device 102. For example, in embodiments, in which a camera is connected to the synchronisation device 102 the device 102 may be arranged to upload files in the folder DCIM, which may therefore be thought of as a predetermined location.

Some embodiments may be arranged to upload only files that have been added to the predetermined location since the last time that the telephone 104 was connected to the synchronisation device 102 since this should reduce the amount of data that needs to be transmitted.

In one convenient method, a user connects his/her telephone 104 to the synchronisation device 102 during an evening. The telephone 104 is then left, for example overnight, and during this time the telephone is charged and also synchronised. Synchronisation may be thought of as uploading data from the telephone and downloading data to the telephone.

Some embodiments of the synchronisation device 102 may be arranged to download data from the or each content server 109 from time to time, which may be periodic. For example, in one embodiment, the synchronisation device 102 is arranged to download data from the or each content server 109 at a predetermined time each day and store the downloaded data within the memory 206; ie the synchronisation device is buffering that data. When a telephone 104 is subsequently connected to the synchronisation device 102 the buffered data may be downloaded to the telephone. An advantage of such a method is that it may be more convenient for a user since data may be transferred to the telephone more quickly than having to wait for it to be transmitted across the second data connection.

Alternatively, or additionally, some embodiments may be arranged to upload data from a telephone 104 connected to the synchronisation device 102 and to buffer that data until a second data connection becomes available. Such an embodiment may be particularly convenient for embodiments of the synchronisation device that are arranged to be portable and which do not always have a second data connection thereto.

Figure 3:
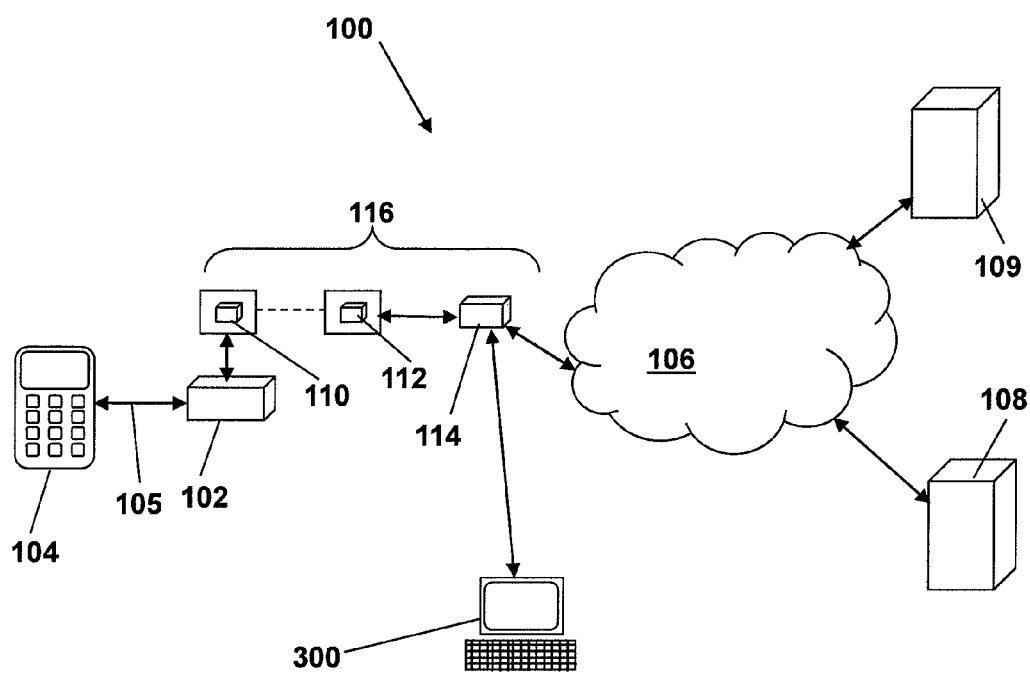
FIGS. 3 and 4 show further example systems embodying the invention.

FIG. 3 shows a further embodiment of a system implementing the invention and like parts are referred to with the same reference number. In addition to the system described in FIG. 1 the system comprises a personal computer 300, such as a PC, an Apple™ or the like which is in communication with a network to which the second data connection 116 establishes a connection. In particular the computer 300 is connected to the MODEM 114.

In some embodiments it is possible for a user of the personal computer 300 to log onto the HTTP server 240 on the synchronisation device 102 in order to the configure the device 102. In such embodiments, the user may or may not be able to amend the connection data.

A user of the computer 300 is able to log onto the control server 108 and amend the connection data which is held (or is at least accessible by) the control server 108. Thus, a user is able to configure the data that will be downloaded to his/her data storage device upon connection to the synchronisation device 102. For example, a user would be able to edit the data held in the or each database that provides his/her user profile.

It will be appreciated the computer need not be directly connected to a network to which the second data connection 116 is connected in order to access either the control server 108 or the synchronisation device 102. However it will be generally convenient if access to the synchronisation device is by computers 300 (or other devices) which are on a network to which the second data connection 116 connects.

Figure 4:
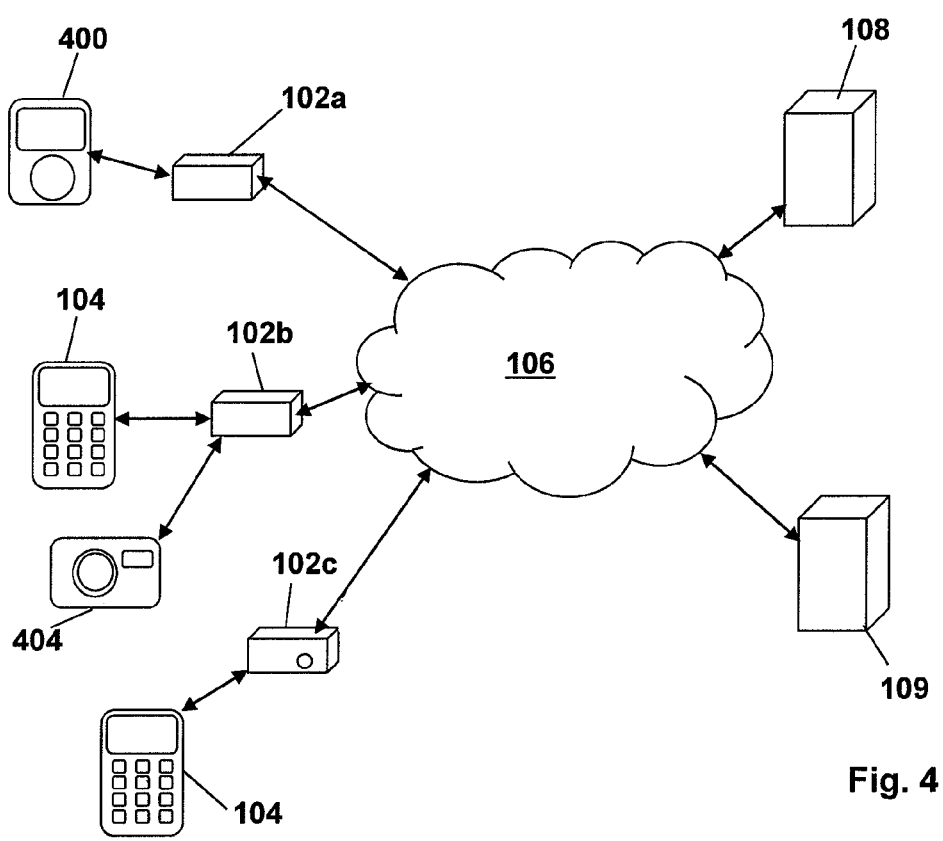

FIG. 4 shows a further embodiment in which the same parts are referenced with the same reference numbers. In this Figure details of the second data connection between the synchronisation device 102 and the Internet 106 are omitted for clarity.

In this embodiment three synchronisation devices 102a to 102c are shown. This could be in the same building or they could be physically remote from one another. However, each allows a data storage device to connect to the Internet 106 and access both the content server 109 or the control server 108.

It will be seen that the synchronisation device 102b has connected thereto two storage devices—a telephone 104 and a camera 404. The synchronisation device may be connected to any number of storage devices such as 1, 2, 3, 4, 5, 6, 10 or more. It will be appreciated that the USB specification allows up to 128 devices to be connected to one another.

In such an embodiment in which the synchronisation device connects to more than one device the reading of a device identifier from the device may allow the synchronisation device to tailor synchronisation that is performed with each device to that device; ie the synchronisation device may have a profile specific to each device connected thereto. The skilled person will appreciate that synchronisation performed for one data storage device 404 may be different compared to synchronisation that would be performed for a second data storage 104.

The synchronisation device 102a has an MP3 player 400 connected thereto.

Figure 5:
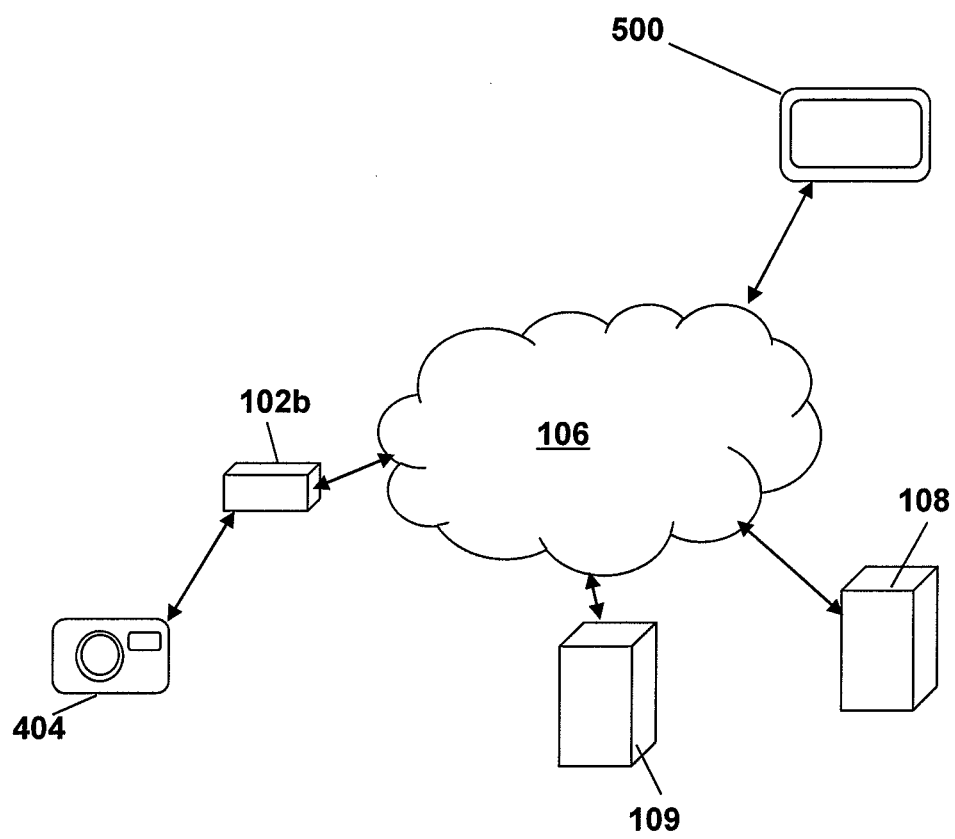
FIG. 5 shows a further embodiment of the invention.

FIG. 5 shows a further embodiment in which the same parts are referenced with the same reference numbers. In this Figure details of the second data connection between the synchronisation device 102 and the Internet 106 are omitted for clarity.

In this embodiment, the synchronisation device 102b is arranged to upload image data from a data storage device (in this embodiment a camera) 404 to a remote display device 500 which in this embodiment is a digital photo frame. The photo frame 500 is connected to the Internet 106 and has an IP address allowing data to be sent thereto.

The skilled person will appreciate that the photo frame may be connected to a network and which that network connects to the Internet in the same way as described herein in relation to how the synchronisation device connects to the Internet 106.

In the embodiment being described, the synchronisation device 102b can be used to establish communication between the data storage device 104 and the display device 500 by using the method as described below.

Initially, a user connects the synchronisation device 102b to the data storage device 104 which uploads a device identifier from the telephone 104. This identifier is then sent to the control server 108 which is arranged to send connection data relating to the telephone 102 back to the synchronisation device 102b.

The connection data received from the control server 108 includes a location on a content server 109 to which data uploaded from the telephone 104 should be sent. Thus, the synchronisation device 102b subsequently uploads data from the telephone 104 to the content server 109.

The user may then disconnect his/her telephone 104 from the synchronisation device 102b and at a later time connect this to a display device 500 such as a photo frame. Again, the synchronisation device is arranged to upload a device identifier from the display device 500 and send this to the control server 108.

The control server sends connection data to the synchronisation device 102b including a pointer to the location at which data is stored from the telephone 104. The synchronisation device may then cause the data stored on the content server 109 to be uploaded to the display device 500.

In subsequent invocations of the method it may not be necessary to connect the synchronisation device 102b to the display device 500 since a link may have been established within the memory of the synchronisation device in order that data uploaded from the telephone 104 may be considered for upload to the display device 500. For example, a user may be able to specify which data is uploaded to the display device 500.

The synchronisation device is arranged to send a USERID and password which have been programmed thereinto to the photo frame in order to gain access. The skilled person will appreciate that a user could also enter the USERID and password rather than having them stored on the synchronisation device.

Once communication has been established between the synchronisation device and the photo frame the synchronisation device uploads images from the camera 404 to the photo frame. The images may be buffered on a storage medium (such as a hard drive) within the synchronisation device or they may be uploaded directly from the camera.

In some embodiments, the synchronisation device comprises a screen, such as an LCD screen, on which a user may view images from the camera and determine which images are to be uploaded to the photo frame. Such embodiments, may also comprise a user input, such as a joystick, a number of buttons, or the like which allow a user to input to the synchronisation device which images should be uploaded.

Figure 7:
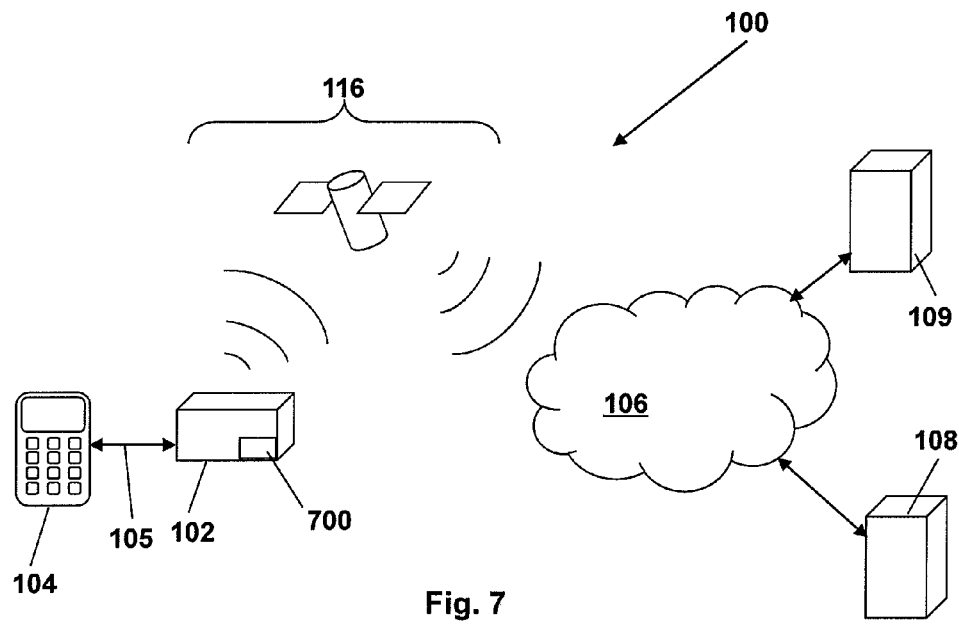
FIG. 7 shows an embodiment in which a synchronisation device is portable.

FIG. 7 shows a further embodiment of a system implementing the invention and like parts are referred to with the same reference number. In this embodiment, the synchronisation device 102 is arranged to be portable and as such comprises a local power source 700 which in this embodiment is a battery. In this embodiment, the capacity of the power source 700 is high enough such that the first data connection 105 can be used to re-charge the telephone 104.

The synchronisation device 102 also comprises a 3G MODEM which allows the device to establish a data connection to the Internet 106. Thus, in such an embodiment the second data connection may be provided by the data connection established using the 3G MODEM.

Other embodiments of the invention may use a MODEM within the data storage device 104 to establish the second data connection 116. Such an arrangement would simplify the circuitry required within the synchronisation device 102.

Yet further embodiments, may allow the synchronisation device 102 to connect to a further device (such a laptop, further telephone, etc) and utilise a data connection between that further device and the Internet 106 as the second data connection 116.

Figure 8:
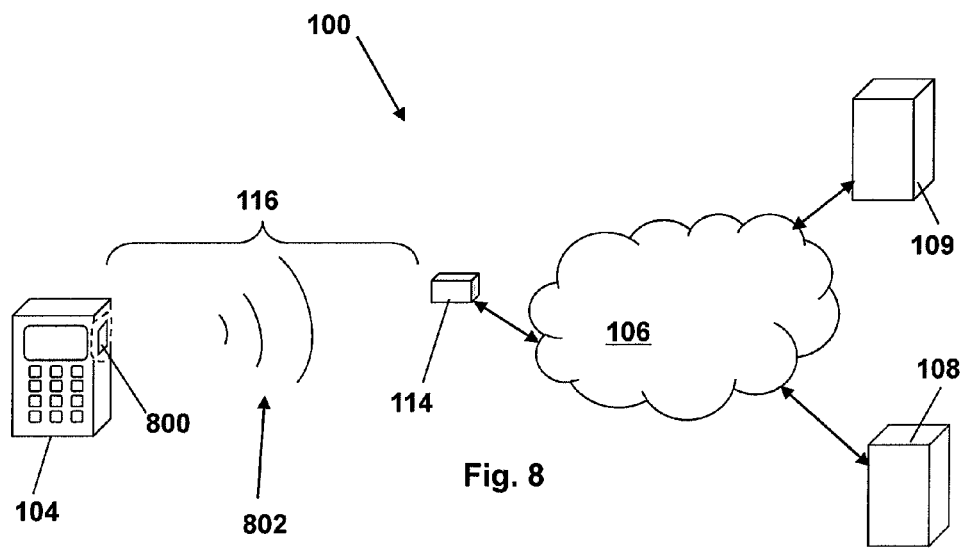
FIG. 8 shows an embodiment in which a storage device comprises a synchronisation module.

FIG. 8 shows a further embodiment of a system according to the invention and like parts are referred to by like reference numbers. However, in this embodiment the synchronisation device has been replace by a synchronisation module 800 provided on the storage device 104.

It will also be seen that it this embodiment, the storage device 104 connects to the MODEM 114 using a WIFI connection 802, which provides the second data connection 116. Yet further embodiments, could utilise a second data connection as described in relation to other Figures. Still yet further embodiments, may replace the power line adapter technology described in relation to earlier Figures with a WIFI link as shown in FIG. 8.

The skilled person will appreciate that in the embodiment of FIG. 8, the first data connection 105, described in relation to other Figures, is provided within the storage device 104 between the synchronisation module 800 and the other processing circuitry of the storage device 104.

An embodiment such as shown in FIG. 8 may be advantageous so as to provide the synchronisation device on the same physical hardware as the storage device. As such, the synchronisation device may then be thought of as a synchronisation module. Such a synchronisation module may be provided as an application running on the storage device which contacts a control server to retrieve connection and capability data that is used by the synchronisation device application to upload, download and adapt the user's data to and from the storage device. However, the skilled person will appreciate that the synchronisation module could equally be provided by firmware, hardware or a combination of software, firmware and/or hardware. As such, in such an embodiment, the synchronisation module may provide the same or at least substantially the same functionality as the synchronisation device described elsewhere.

In such an embodiment, the synchronisation module may be automatically triggered by the storage device being connected to a power supply.

Embodiments, of the system may be implemented so as to perform any one or more of the following list iii to xiv. Reference to data may include reference to content and/or program data.

iii. the synchronisation device may be arranged, from time to time, which may be periodically or on demand, download all or any content data from the data storage device for backup on a content server iv. examine content data on the data storage device and in other locations and conditionally upload data from the data storage device. Conditions that may be applied include any one or more of:
    a) content data on the storage device
    b) connection data received from the control server
    c) capability data received from the control server
    d) other data held on the control server
    e) data held on the content server
    f) data held on a 3rd party server that is not the content server
    g) data held on a second or subsequent storage device
    h) the synchronisation device, including its clock, any other applications that are running and any information the synchronisation device can obtain from sensors and data stores that it can access v. examine content data on the content server and in other locations and conditionally download data to the storage device. Conditions that may be applied include any one or more of
    a) content data on the storage device
    b) connection data received from the control server
    c) capability data received from the control server
    d) other data held on the control server
    e) data held on the content server
    f) data held on a 3rd party server that is not the content server
    g) data held on a second or subsequent data storage device
    h) the synchronisation device, including its clock, any other applications that are running and any information the synchronisation device can obtain from sensors and data stores that it can access vi. combine data from the data storage device with data from other sources such as those listed below to form one or more new files created using such inputs before sending this new data to one or more content servers.
    a) content data on the storage device
    b) connection data received from the control server
    c) capability data received from the control server
    d) other data held on the control server e) data held on the content server
f) data held on a 3rd party server that is not the content server
g) data held on a second or subsequent data storage device
h) the synchronisation device, including its clock, any other applications that are running and any information the synchronisation device can obtain from sensors and data stores that it can access vii. combine data from the content server with data from other sources such as those listed below to form one or more new files created using such inputs before sending this new data to the data storage device and/or a new content server.
a) content data on the storage device
b) connection data received from the control server
c) capability data received from the control server
d) other data held on the control server
e) data held on the content server
f) data held on a 3rd party server that is not the content server
g) data held on a second or subsequent storage device
h) the synchronisation device, including its clock, any other applications that are running and any information the synchronisation device can obtain from sensors and data stores that it can access viii. deliver applications and/or operating system components to the storage device to be run on the storage device ix. control applications on the storage device by providing inputs to such an application x. integrate applications on the data storage device with applications on the synchronisation device to facilitate the extraction of data from any layer of the storage device and to send that on to a content server where such a content server may also be a second storage xi. allow a remote agent to view and remotely control any applications run on either the synchronisation device and/or the storage device and/or to inspect and/or modify any given element on the storage device xii. allow an application on the synchronisation device to automatically and remotely inspect and/or modify any given element on the data storage device xiii. allow an application on the synchronisation device working in conjunction with an application on the data storage device to automatically and remotely inspect and/or modify any given element on the data storage device xiv. allow an application on the data storage device to automatically and remotely inspect and/or modify any given element on the data storage device It will also be well understood by persons of ordinary skill in the art that whilst the embodiment described herein implement certain functionality by means of software, that functionality could equally be implemented solely in hardware (for example by means of one or more ASICs (application specific integrated circuit)) or indeed by a mix of hardware and software. As such, the scope of the present invention should not be interpreted as being limited only to being implemented in software.

The invention claimed is:

1. A data synchronisation system comprising:
a data storage device comprising a device identifier;
a synchronisation device arranged to upload and download content data respectively stored or to be stored on the data storage device and to process that content data;
a control server arranged to generate connection data, and capability data providing the capabilities of the storage device associated with a device identifier, the connection and capability data being arranged to control operation of the synchronisation device; and
one or more content servers;
wherein the synchronisation device is arranged to have connected thereto the data storage device, to access the device identifier, to establish a connection to the control server and/or the content server via a network and to send the device identifier to the control server;
the control server is arranged to receive the device identifier, process the device identifier and to send connection and capability data to the synchronisation device, according to the device identifier, the connection data determines to which content server the synchroization device establishes a connection; and
the synchronisation device being further arranged to process the connection and capability data and establish a connection with the or each content server based upon the connection and/or capability data and, further, dependent upon the connection data to perform at least one of:

i. download content data held in a first format from the or each content server specified in the connection data, adapt the content data from the first format according to the data storage device capabilities held in the capability data to a data storage device format that the data storage device is capable of processing and upload the adapted content data to the data storage device; and ii. download content data from the data storage device, adapt the downloaded content data according to the capability data to be compatible with the destination content server as specified in the connection data and upload content data received from the data storage device to the destination content server.

2. The system of claim 1 in which the synchronisation device is a dedicated device.

3. The system of claim 1 which further comprises a profile database from which the capability data is generated containing data identifying any of the following, using the device identifier as unique identifier to the database:
a list of one or more data storage device formats the data storage device is capable of utilizing;
a list of one or more content server to which the data storage device can upload content data; and
a list of one or more content server from which the data storage device may download content data.

4. The system of claim 3 in which the profile database is held on the content server.

5. The system of claim 1 in which the data storage device is connected to the synchronisation device by a first network connection which is a wired connection and wherein the wired connection may be arranged to charge the data storage device.

6. The system of claim 1 in which the synchronisation device is connected to a second network which is connected to a Wide Area Network (WAN), such as the Internet.

7. The system of claim 1 in which the synchronisation device is provided within the housing of mains plug arranged to be plugged into a mains socket and/or provided with a cable which plugs into a mains socket.

8. The system of claim 6 in which the synchronisation device is arranged to store data from the data storage device upon a remote data display device connected to the second network and/or a WAN connected to the second network.

9. A synchronisation device comprising:
processing circuitry;
a first data connection arranged to have a data storage device connected thereto and in communication with the processing circuitry;

a second data connection arranged to connect the synchronisation device to a network and pass data to and from the network from the processing circuitry;
wherein
the processing circuitry being arranged to:
1. establish a connection with a data storage device connected to the first data connection, obtain a device identifier from the data storage device and forward the device identifier across the second data connection;
2. receive connection data, and capability data providing capabilities of the storage device specific to the device identifier sent across the second data connection from the second data connection and subsequently process said connection and capability data;
the processing circuitry being further arranged to process the connection and capability data and perform at least one of the following steps;
3. download data from a content server held in a first format at a location specified by the connection data, adapt the content data from the first format according to the data storage device capabilities held in the capability data to a data storage device format that the data storage device is capable of processing and upload content data in the data storage device format to a data storage device connected thereto; and
4. download content data from a storage device, adapt, according to the capability data, the download content data to be compatible with the destination content server as specified in the connection data and upload content data from received from the data storage device to that destination content server.

10. The device according to claim 9 in which the first data connection is a wired connection arranged to charge the data storage device as it is connection to the synchronisation device.

11. The device according to claim 9 which comprises a local storage device, such as a hard drive.

12. A method of synchronizing data held on a data storage device comprising the following steps:
i. establishing a connection with the data storage device and a synchronisation device and reading a device identifier from the data storage device;
ii. establishing a connection between the synchronisation device and a control server via a second data connection forwarding the device identifier to the control server;
iii. sending connection data from the control server to the synchronisation device, the connection data being generated according to the device identifier and including capability data providing the capabilities of the storage device associated with the device identifier, and the connection data providing the address of one or more content servers for the device identified by the device identifier;
iv. causing the synchronisation device to download content data to the data storage device from the content server specified in the connection data after adapting the content data, according to the capability data, from a first data format as held on the content server to a data storage device format that the data storage device is capable of processing and/or uploading content data from the storage device to a location specified by the connection data after adapting, according to the capability data, the content data to be compatible with the content service at the specified location.

13. The method of claim 12 further comprising generating the capability data from a profile database containing data identifying any of the following, using the device identifier as unique identifier to the database:
a list of one or more data storage device formats the data storage device is capable of utilizing;
a list of one or more content server to which the data storage device can upload content data;
a list of one or more content server from which the data storage device may download content data.

14. A control server comprising:
a processing circuitry;
a network connection arranged to receive and transmit data between the processing circuitry and a network connected to the network connection;
a data store accessible by the processing circuitry and being arranged to store connection data;
the processing circuitry being arranged to:
receive data from the network indicative that a synchronisation device is requesting data from the network and the data including a device identifier;
access the data store and retrieve connection and capability data associated with the identifier specified in the data received from the network, the capability data providing the capabilities of a data storage device with which the device identifier is associated; and
transmit the connection and capability data to the synchronisation device via the network connection, the connection data including a location at which a device is arranged to store data and/or a location from which the data storage device is arranged to receive data.

15. The control server of claim 14 further comprising a profile database which is used to generate the capability data, the profile database containing data identifying any of the following, using the device identifier as unique identifier to the database:
a list of one or more data storage device formats the data storage device is capable of utilizing;
a list of one or more content server to which the data storage device can upload content data; and
a list of one or more content server from which the data storage device may download content data.

16. A non-transitory machine readable medium containing instructions which when read onto a machine cause that machine to synchronise data held on a data storage device by performing the steps of:
i. establishing a connection with the data storage device and a synchronisation module and reading a device identifier from the data storage device;
ii. establishing a connection between the synchronisation module and a control server via a second data connection forwarding the device identifier to the control server;
iii. sending connection data from the control server to the synchronisation module, the connection data being generated according to the device identifier and including capability data providing the capabilities of the data storage device associated with the device identifier, and the connection data providing the address of one or more content servers for the device identified by the device identifier;
iv. causing the synchronisation module to download content data to the data storage device from the content server specified in the connection data after adapting the content data, according to the capability data, from a first data format as held on the content server to a data storage device format that the data storage device is capable of processing and/or uploading content data from the storage device to a location specified by the connection data after adapting, according to the capability data, the content data to be compatible with the content service at the specified location.

17. A data synchronisation system comprising:
a data storage device comprising a device identifier and further comprising a
a synchronisation module, the synchronisation module uploading and downloading to upload and download content data respectively stored or to be stored on the data storage device and processing that content data;
a control server arranged to generate connection data, and capability data providing the capabilities of the storage device associated with a device identifier, the connection and capability data being arranged to control operation of the synchronisation module; and
one or more content servers;
wherein the synchronisation module accesses the device identifier, to establish a connection to the control server and/or the content server via a network and to send the device identifier to the control server;
the control server is arranged to receive the device identifier, process the device identifier and to send connection and capability data to the synchronisation module, according to the device identifier, the connection data determines to which content server the synchronisation module establishes a connection; and
the synchronisation module processes the connection and capability data and establishes a connection with the or each content server based upon the connection and/or capability data and, further, dependent upon the connection data to perform at least one of:
i: is downloading content data held in a first format from the or each content server specified in the connection data, adapt the content data from the first format according to the data storage device capabilities held in the capability data to a data storage device format that the data storage device is capable of processing and uploading the adapted content data to the data storage device; and
ii. downloading content data from the data storage device, adapt the downloaded content data according to the capability data to be compatible with the destination content server as specified in the connection data and uploading content data received from the data storage device to the destination content server.

18. The non-transitory machine readable medium of claim 16, wherein the synchronisation module is at least one of software, firmware, hardware and a combination of software, firmware and/or hardware.

19. The data synchronisation system of claim 17, wherein the synchronisation module is at least one of software, fimiware, hardware and a combination of software, firmware and/or hardware.

20. A computing device comprising:
processing circuitry;
a first data connection arranged to have a data storage device connected thereto and in communication with the processing circuitry;
a second data connection arranged to connect a synchronisation module provided on the computing device to a network and pass data to and from the network from the processing circuitry;
wherein
the processing circuitry being arranged to:
1. establish a connection with a data storage device connected to the first data connection, obtain a device identifier from the data storage device and forward the device identifier across the second data connection;
2. receive connection data, and capability data providing capabilities of the storage device specific to the device identifier sent across the second data connection from the second data connection and subsequently process said connection and capability data;
the processing circuitry being further arranged to process the connection and capability data and perform at least one of the following steps;
3. download data from a content server held in a first format at a location specified by the connection data, adapt the content data from the first format according to the data storage device capabilities held in the capability data to a data storage device format that the data storage device is capable of processing and upload content data in the data storage device format to a data storage device connected thereto; and
4. download content data from a storage device, adapt, according to the capability data, the download content data to be compatible with the destination content server as specified in the connection data and upload content data from received from the data storage device to that destination content server.

* * * * *